US009306967B2

(12) United States Patent
Webb et al.

(10) Patent No.: US 9,306,967 B2
(45) Date of Patent: Apr. 5, 2016

(54) NETWORK APPLIANCE FOR VULNERABILITY ASSESSMENT AUDITING OVER MULTIPLE NETWORKS

(71) Applicant: CALLAHAN CELLULAR L.L.C., Wilmington, DE (US)

(72) Inventors: Evan M. Webb, Seattle, WA (US); Christopher D. Boscolo, Bellevue, WA (US); Robert G. Gilde, Issaquah, WA (US)

(73) Assignee: Callahan Cellular L.L.C., Wilmington, DE (US)

( * ) Notice: Subject to any disclaimer, the term of this patent is extended or adjusted under 35 U.S.C. 154(b) by 0 days.

(21) Appl. No.: 14/015,138

(22) Filed: Aug. 30, 2013

(65) Prior Publication Data

US 2014/0013384 A1 Jan. 9, 2014

Related U.S. Application Data

(63) Continuation of application No. 11/877,496, filed on Oct. 23, 2007, now Pat. No. 8,554,903, which is a continuation of application No. 11/331,776, filed on Jan. 13, 2006, now Pat. No. 7,310,669.

(Continued)

(51) Int. Cl.
*G06F 11/00* (2006.01)
*H04L 29/06* (2006.01)
*G06F 15/173* (2006.01)

(52) U.S. Cl.
CPC ......... *H04L 63/1433* (2013.01); *H04L 63/1408* (2013.01)

(58) Field of Classification Search
CPC ............ H04L 63/1408; H04L 63/1433; H04L 67/025
See application file for complete search history.

(56) References Cited

U.S. PATENT DOCUMENTS

| 5,577,209 A | 11/1996 | Boyle et al. |
| 5,583,848 A | 12/1996 | Glitho et al. |

(Continued)

FOREIGN PATENT DOCUMENTS

| WO | 2005069823 A2 | 8/2005 |
| WO | 2006078729 A2 | 7/2006 |

(Continued)

OTHER PUBLICATIONS

B. Aboba et al.: "Extensible Authentication Protocol (EAP)," IETF RFC 3748, Jun. 2004; http://tools.leff.org/html/rfc3748 (accessed Nov. 15, 2006).

(Continued)

*Primary Examiner* — Wen-Tai Lin
(74) *Attorney, Agent, or Firm* — Brundidge & Stanger, P.C.

(57) ABSTRACT

An apparatus, system, and method are directed towards enabling auditing of network vulnerabilities from multiple network vantage points virtually simultaneously. Multiple network vantage points may include, but are not limited to, remote/branch enterprise sites, devices on an enterprise perimeter, on either side of a security perimeter, and even through the security perimeter. In one embodiment, an auditor performs reflected audits thereby extending auditing of network vulnerabilities to provide a comprehensive 360 degree audit of internal, external, and remote enterprise network sites. In one embodiment, the present invention may be implemented employing a single auditing device, and one or more audit extension devices that are configured to extend the auditing device's audit reach. The auditing device and one or more audit extension devices may communicate using an encrypted network channel through a security perimeter and/or across multiple networks.

18 Claims, 10 Drawing Sheets

Related U.S. Application Data

(60) Provisional application No. 60/645,437, filed on Jan. 19, 2005, provisional application No. 60/647,646, filed on Jan. 26, 2005, provisional application No. 60/733,392, filed on Nov. 4, 2005.

(56) References Cited

U.S. PATENT DOCUMENTS

| | | | |
|---|---|---|---|
| 5,987,610 | A | 11/1999 | Franczek et al. |
| 6,035,405 | A | 3/2000 | Gage et al. |
| 6,073,142 | A | 6/2000 | Geiger et al. |
| 6,460,050 | B1 | 10/2002 | Pace et al. |
| 6,487,600 | B1 | 11/2002 | Lynch |
| 7,174,517 | B2 | 2/2007 | Barnett et al. |
| 7,284,062 | B2 | 10/2007 | Krantz et al. |
| 7,467,405 | B2 | 12/2008 | Cheng |
| 7,469,139 | B2 | 12/2008 | Van De Groenendaal |
| 7,505,596 | B2 | 3/2009 | Duplessis et al. |
| 7,506,155 | B1 | 3/2009 | Stewart et al. |
| 7,533,407 | B2 | 5/2009 | Lewis et al. |
| 7,617,533 | B1 | 11/2009 | Hernacki |
| 7,770,225 | B2 * | 8/2010 | Hammond ............... 726/25 |
| 2001/0023486 | A1 | 9/2001 | Kayashima et al. |
| 2002/0066035 | A1 | 5/2002 | Dapp |
| 2002/0154178 | A1 | 10/2002 | Barnett et al. |
| 2002/0162026 | A1 | 10/2002 | Neuman et al. |
| 2003/0101355 | A1 | 5/2003 | Mattsson |
| 2003/0149888 | A1 | 8/2003 | Yadav |
| 2003/0217148 | A1 | 11/2003 | Mullen et al. |
| 2004/0006546 | A1 | 1/2004 | Wedlake et al. |
| 2004/0117624 | A1 | 6/2004 | Brandt et al. |
| 2004/0158735 | A1 | 8/2004 | Roese |
| 2004/0255154 | A1 | 12/2004 | Kwan |
| 2004/0260760 | A1 | 12/2004 | Curnyn |
| 2005/0050336 | A1 | 3/2005 | Liang et al. |
| 2005/0097357 | A1 | 5/2005 | Smith |
| 2005/0152305 | A1 | 7/2005 | Ji et al. |
| 2005/0257267 | A1 | 11/2005 | Williams et al. |
| 2005/0273853 | A1 | 12/2005 | Oba et al. |
| 2006/0028996 | A1 | 2/2006 | Huegen et al. |
| 2006/0168648 | A1 | 7/2006 | Vank et al. |
| 2007/0192862 | A1 | 8/2007 | Vermeulen et al. |
| 2008/0060076 | A1 | 3/2008 | Webb et al. |
| 2010/0299695 | A1 * | 11/2010 | Watson et al. ............. 725/25 |

FOREIGN PATENT DOCUMENTS

| | | | |
|---|---|---|---|
| WO | 2006081237 | A2 | 8/2006 |
| WO | 2006081302 | A2 | 8/2006 |

OTHER PUBLICATIONS

Final Office Action in U.S. Appl. No. 12/879,319, mailed on Jun. 6, 2012.

"IEEE 802.1X," Wikipedia, the free encyclopedia, 2 pages, http://en.wikipedia.org/wiki/802.1x (accessed Nov. 15, 2006).

International Search Report and Written Opinion mailed Sep. 20, 2007, which issued during the prosecution of International Patent Application No. PCT/US06/01753.

International Search Report and Written Opinion mailed Sep. 24, 2007, which issued during the prosecution of International Patent Application No. PCT/US06/02466.

International Search Report, dated Apr. 25, 2007, for corresponding PCT Application No. PCT/US06/02663, filed Jan. 25, 2006.

L. Blunk et al.: "PPP Extensible Authentication Protocol (EAP)," IETF RFC2284, Mar. 1998; http:Mools.ieff.org/html/rfc2284 (accessed Nov. 15, 2006).

Lars Strand, "802.1X Port-Based Authentication HOWTO", Aug. 18, 2004, Linux Online, Chapter 1, Website: http://www.linux.org/docs/Idp/howto/8021X-HOWTO/introl.html, printed Oct. 15, 2009, 8 pages.

Non-Final Office Action in U.S. Appl. No. 11/331,776, mailed on Mar. 13, 2007.

Non-Final Office Action in U.S. Patent Application Serial No. 121879,319, mailed on Feb. 3, 2012.

Notice of Allowance in U.S. Appl. No. 11/331,776, mailed on Jul. 10, 2007.

Notice of Allowance in U.S. Appl. No. 11/331,776, mailed on Oct. 28, 2007.

Notice of Allowance in U.S. Appl. No. 12/879,319, mailed on Apr. 26, 2013.

Notice of Allowance in U.S. Appl. No. 12/879,319, mailed on Aug. 29, 2012.

Notice of Allowance in U.S. Appl. No. 12/879,319, mailed on Dec. 4, 2012.

Request for Continued Examination in U.S. Appl. No. 11/331,776, filed on Oct. 5, 2007.

Request for Continued Examination in U.S. Appl. No. 12/879,319, filed on Nov. 26, 2012.

Response to Final Office Action in U.S. Appl. No. 12/879,319, filed on Aug. 6, 2012.

Response to Non-Final Office Action dated Feb. 3, 2012 in U.S. Appl. No. 12/879,319, filed on May 3, 2012.

Response to Non-Final Office Action dated Mar. 13, 2007 in U.S. Appl. No. 11/331,776, filed on Apr. 27, 2007.

U.S. Appl. No. 11/331,776, Official Communication mailed Mar. 13, 2007.

U.S. Appl. No. 11/461,321, filed Jul. 31, 2006, entitled, "Network Appliance for Customizable Quarantining of a Node on a Network," Inventor: Robert G. Glide, et al.

* cited by examiner

NETWORK APPLIANCE FOR VULNERABILITY ASSESSMENT AUDITING OVER MULTIPLE NETWORKS

CROSS-REFERENCE TO RELATED APPLICATIONS

The present application is a continuation application of U.S. patent application Ser. No. 11/877,496, filed Oct. 23, 2007, now U.S. Pat. No. 8,554,903, which is a continuation application of U.S. patent application Ser. No. 11/331,776, filed on Jan. 13, 2006, now U.S. Pat. No. 7,310,669, issued on Dec. 18, 2007, which claims priority to provisional application No. 60/645,437, filed on Jan. 19, 2005, and provisional application No. 60/647,646, filed on Jan. 26, 2005, and further from provisional application No. 60/733,392, filed on Nov. 4, 2005, their entire disclosures of which are incorporated herein by reference.

FIELD OF THE INVENTION

The present invention relates to network security, and particularly, but not exclusively, to a method, apparatus, and system for enabling auditing of network vulnerabilities from multiple network vantage points.

BACKGROUND OF THE INVENTION

Businesses are deriving tremendous financial benefits from using the internet to strengthen relationships and improve connectivity with customers, suppliers, partners, and employees. Progressive organizations are integrating critical information systems including customer service, financial, distribution, and procurement from their private networks with the Internet. The business benefits are significant, but not without risk. Unfortunately, the risks are growing.

In response to the growing business risks of attacks, potentials for legal suits, federal compliance requirements, and so forth, companies have spent millions to protect the digital assets supporting their critical information systems. Most companies have invested, for example, in firewalls, anti-virus, and intrusion detection/prevention systems. However, many of the known exploits to businesses occur with businesses that had deployed some or all of these security technologies.

The reactive nature of many of these security technologies, and the well documented knowledge that network exploits essentially leverage known vulnerabilities, point to an immediate need for a more proactive solution. Many of these businesses include enterprise networks that have become increasingly segmented, often by security technologies, such as firewalls. Many of the businesses may have employed, for example, multiple tiers of firewalls, often using a multi-vendor approach. Such approaches also may have split the business's internal networks, implementing multiple levels of trust. These solutions therefore, have often created security nightmares that may ultimately cost the business and put them at further risk. Therefore, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE INVENTION

Figure 1:
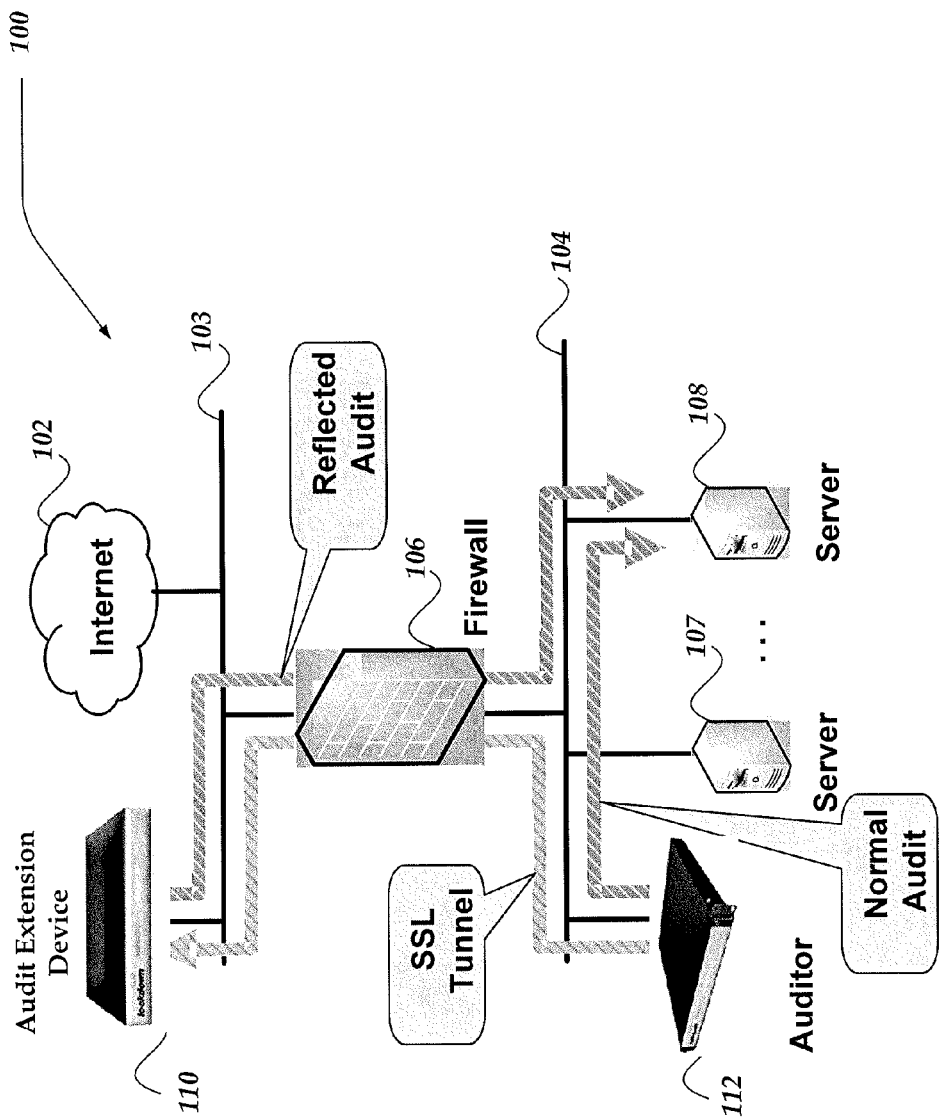
FIG. 1 illustrates one embodiment of an environment employing the invention through an enterprise firewall.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "node" includes virtually any computing device that is capable of connecting to a network. Such devices include, but are not limited to, personal computers, multiprocessor systems, microprocessor-based or programmable consumer electronics, network PCs, servers, network appliances, and the like. A node may refer to a client device, a server device, or the like.

As used herein, the term "audit" refers to an evaluation of a network device, or other computing asset, to determine its compliance with a policy. The audit typically is directed toward computing security aspects of the network device including controls, applications, procedures, operational aspects, and so forth. For example, the audit may evaluate how the network device responds to a network request, a configuration request, a resource request, a probe, or the like. In one embodiment, an audit may result in the network device providing security information about itself, such as whether patches have been performed, whether anti-virus programs are installed, or the like. Thus, the audit may include a request. In one embodiment, the request is for information about the network device. The audit request may also result in an action or other response by the network device for which the audit may be interested. In one embodiment, the audit may also provide recommendations on changes in control, configuration, security policy, procedures, or the like, based on a result of the audit. In another embodiment, the result of the audit may be used to deny access to the network resource, quarantine the network resource, or the like.

As used herein, the term "reflected audit" refers to a form of audit that may be initiated by a computing device on one side of a security perimeter and that may be sent through the security perimeter to be turned towards or reflected to a computing asset. In one embodiment, the reflected audit is towards a computing asset on another side of the security perimeter. In one embodiment, the reflected audit is turned back towards through security perimeter to a computing asset within or on the security perimeter. Such reflected audits are directed towards extending an audit across one or more security perimeters.

The term "security perimeter" refers to an electronic boundary substantially surrounding one or more computing assets. The security perimeter is directed towards managing access to the computing assets based in part on a policy. The security perimeter may be implemented through a single network device, such as a switch, router, bridge, or the like, or through a variety of network devices. Such network devices may also include applications arranged to inspect network traffic and perform filtering decisions including whether the network traffic may flow through the security perimeter. One embodiment of a network device that includes such filtering application is a firewall. However, the invention is not constrained to firewalls, and packet filters, gateways, proxy servers, and the like may also be included.

Briefly stated, the present invention is directed towards an apparatus, system, and method for enabling auditing of network vulnerabilities from multiple network vantage points virtually simultaneously. Multiple network vantage points may include, but are not limited to, remote/branch enterprise sites, devices on an enterprise perimeter, on either side of a security perimeter, and even through the security perimeter. As such, the invention provides reflected audits thereby extending auditing of network vulnerabilities to provide a comprehensive 360 degree audit of internal, external, and remote enterprise network sites. In one embodiment, the present invention may be implemented employing a single auditing device, and one or more audit extension devices that are configured to extend the auditing device's audit reach to remote data sites. The auditing device and one or more audit extension devices may communicate using an encrypted network channel through a security perimeter and/or across multiple networks. However, if the operation of the auditing device is determined to be unacceptable, an audit extension device can automatically assume a master mode of operation. In one embodiment, such mode of operation may be maintained by the audit extension device until an auditing device becomes available to assume the master mode of operation.

In embodiment, the master operation of a primary auditing device may be mirrored by a secondary auditing device, which can assume at least a portion of the master operations if the primary auditing device is unavailable to do so, such as when a failure condition (or fail-safe condition) occurs, or the like. In one embodiment, the secondary auditing device may be an audit extension device. Similarly, in one embodiment, the slave operation of a primary audit extension device may be mirrored by a secondary audit extension device, which can assume at least a portion of the slave operations if the primary audit extension device is unavailable to do so, such as when a fail-safe condition occurs, or the like.

Illustrative Operating Environment

FIG. 1 illustrates one embodiment of an environment employing the invention through an enterprise firewall. System 100 may include many more, or less, components than those shown, however, those shown are sufficient to disclose an illustrative embodiment for practicing the invention.

As shown in the figure, system 100 includes networks 102-104, firewall 106, servers 107-108, auditor 112, and audit extension device 110. Audit extension device 110 is in communication with auditor 112 and servers 107-108 through firewall 106. Auditor 112 is in communication with servers 107-108.

Servers 107-108 may include any computing device capable of providing information in response to a request from another device. As shown in FIG. 1, servers 107-108 may be configured to operate as mail servers, however, the invention is not so constrained, and servers 107-108 may be configured to operate as web servers, database servers, application servers, and the like. Moreover, one of servers 107-108 may be configured as a mail server, while another is configured to provide a different service, without departing from the scope of spirit of the invention. Such devices include personal computers, desktop computers, multiprocessor systems, microprocessor-based or programmable consumer electronics, network PCs, servers, and the like.

Firewall 106 may include any computing device that is capable of implementing a security policy designed to keep a network, or other computing assets, secure from intruders. As such, firewall 106 may be implemented as a router that filters out unwanted packets or may comprise a combination of routers and servers each performing some type of network traffic filtering. For example, firewall 106 may be configured as a proxy server, a gateway, a bridge, or the like. As such, firewall 106 illustrates one embodiment of a network device that enables implementation of a security perimeter. In one embodiment, firewall 106 may be considered to be 'on' the security perimeter. The security perimeter is directed towards managing access to such resources as servers 107-108 by devices on the other side of the security perimeter than servers 107-108 (e.g., devices, not shown, that may reside within internet 102, on network 103, or the like).

Devices that may operate as firewall 106 include personal computers, desktop computers, multiprocessor systems, microprocessor-based or programmable consumer electronics, network PCs, servers, routers, bridges, network appliances, and the like.

Auditor 112 includes virtually any computing device that is configured to manage dynamic network access control. In one embodiment, auditor 112 may enable a security audit to be performed. In one embodiment, auditor 112 may also provide an audit report and remediation to virtually eliminate vulnerabilities, and secure a network infrastructure. In one configuration, auditor 112 may provide end-to-end automated vulnerability management, with network audits being scheduled daily, on-demand, after configuration changes, or the like based on at least a security policy. In one embodiment, auditor 112 employs a policy system that enables extensive user-customization. In one embodiment, auditor 112 may employ a secure web interface which is directed towards simplifying management of enterprise networks.

Auditor 112 may also enable management of network access control at a network switch port level. In one embodiment, auditor 112 provides services and controlled network access that includes quarantining nodes so that they may be identified, audited, and provided an opportunity to be brought into compliance with a security policy, or the like. Auditor 112 may be configured to detect a device seeking to join or otherwise access the network, identify a switch port that the device is attempting to connect to, and determine if the device is authentic and authorized to join the network. As shown, the device seeking to join or otherwise access the network may be servers 107-108, a client device (not shown), or the like. In one embodiment, the network may be an intranet, such as an enterprise's intranet, or the like. For example, the network may be one of networks 103-104. If it is determined that the device is unauthorized and/or unauthentic, the device may be quarantined. In one embodiment, the suspect device is quarantined using, for example, a Virtual Local Area Network (VLAN) (not shown). The act of quarantining the suspect device may also be explained to a user of the suspect device, allowing the user and/or device to be identified and registered. The suspect device may then be audited to determine if there are vulnerabilities that might further prevent the device from connecting to the network. If vulnerabilities are determined, in one embodiment, remediation action may be employed to guide the suspect device, user, and/or administrator of the suspect device towards a resolution of the vulnerabilities, such that the device may be reconfigured for acceptance onto the network.

Auditor 112 may also be configured to provide a variety of audits and reports to audit extension device 110, which may be searchable, and/or archived. Auditor 112 may also provide audit extension device 110 with a variety of alerting information employing tickets, emails, pages, SNMP traps, or the like. In one embodiment, auditor 112 may be configured to initiate or otherwise request that audit extension device 110 perform an audit, such as a reflected audit on one or more computing devices, networks, or the like. In another embodiment, auditor 112 may perform the audit by sending the audit In one embodiment, auditor 112 employs a secure network path to communicate with audit extension device 110, and/or servers 107-108.

Audit extension device 110 is described in more detail below, in conjunction with FIG. 6. Briefly, however, audit extension device 110 may be configured to communicate with auditor 112 to provide a point-of-presence on another network, such as networks 102-103, and/or the like. In one embodiment, the communication is performed over a secure network path, employing such as Secure Socket Layer (SSL), Transport Layer Security (TLS), Extensible Authentication Protocol Transport Layer Security (EAP-TLS), or the like.

As shown in FIG. 1, an audit may be performed, for example, by auditor 112, upon network 104 and/or servers 107-108 through audit extension device 110. That is, audit extension device 110 may be configured to provide a reflected audit of servers 107-108, through firewall 106, and/or networks 103-104. In one embodiment, the reflected audit is performed by auditor 112 using audit extension 112 to extend its reach. Thus, in one embodiment, auditor 112 may perform a vulnerability assessment upon devices on network 104, through firewall 106 by employing audit extension device 110 to extend its reach to other devices and networks. The reflected audits may further enable an evaluation of aspects of servers 107-108 that may operate differently when performed through a firewall. For example, such as when a request for access, information, and the like, is perceived to be from an outside source, an internal source responds to a request, and the like.

In another embodiment, the audit may be initiated or otherwise requested by auditor 112, and performed by audit extension 110, rather than through audit extension 112. In any event, results of the audits may be provided to auditor 112 for review and possible remediation.

Networks 102-104 are configured to couple one computing device to another computing device to enable them to communicate. As shown in the figure, network 102 may represent the Internet, while network 103 may represent an external and/or perimeter network, and network 104 may represent an internal network to an enterprise. Thus, networks 102-103 may be considered to be on one side of the security perimeter, while network 104 may reside on the other side of the security perimeter.

Networks 102-104 are enabled to employ any form of computer readable media for communicating data from one electronic device to another. Generally, networks 102-104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs can include, for example, twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices can be remotely connected to either LANs or WANs via a modem and temporary telephone link.

Networks 102-104 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as a mobile device with various degrees of mobility. For example, networks 102-104 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, networks 102-104 may include virtually any wireless communication mechanism by which data may travel between one computing device and another computing device.

The media used to transmit data in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any data delivery media. The terms "modulated data signal," and "carrier-wave signal" includes a signal that has one or more of its characteristics set or changed in such a manner as to encode data, instructions, data, and the like, in the signal. By way of example, communication media includes wired media such as twisted pair, coaxial cable, fiber optics, wave guides, and other wired media and wireless media such as acoustic, RF, infrared, and other wireless media.

Servers 107-108 represent one embodiment of a computing asset upon which an enterprise may perform a computing security audit. However, the invention is not limited to performing computing security audits on servers 107-108. For example, a computing security audit may also be performed upon network 104, firewall 106, or the like, without departing from the scope or spirit of the invention.

Figure 2:
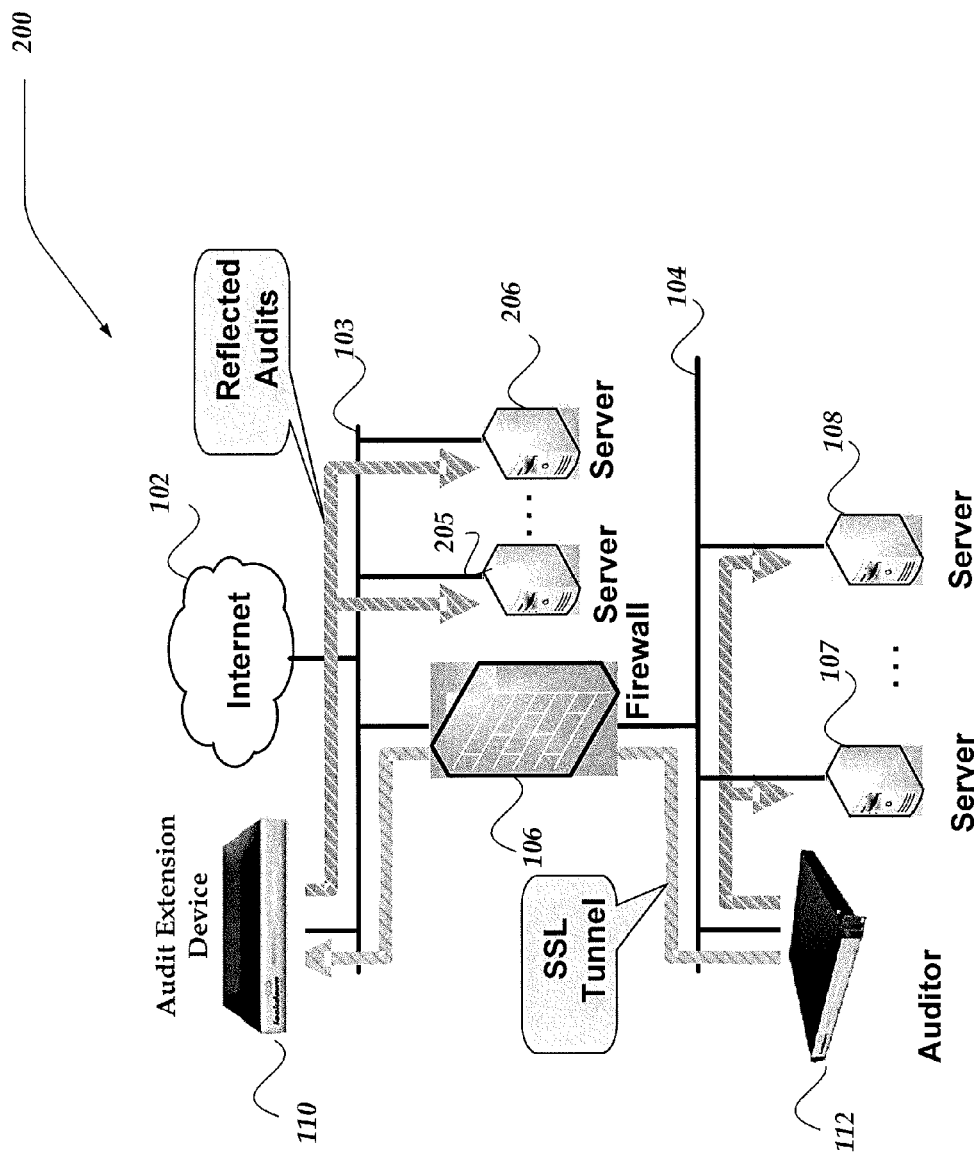
FIG. 2 illustrates one embodiment of an environment employing the invention outside of a firewall.

FIG. 2 illustrates one embodiment of an environment employing the invention outside of a firewall. System 200 may include many more, or less, components than those shown, however, those shown are sufficient to disclose an illustrative embodiment for practicing the invention.

As shown in the figure, system 200 includes components that are substantially similar to those in FIG. 1. This includes networks 102-104, servers 107-108, auditor 112, firewall 106, and audit extension device 110. Such components may operate in a substantial similar manner to that described above. In addition, FIG. 1 further illustrates servers 205-206. As shown, servers 205-206 are in communication with audit extension device 110.

As shown in the figure, servers 205-206 may be configured to operate on network 103, which may operate as a perimeter network, a demilitarized zone (DMZ), an external network, or the like. In one embodiment, servers 205-206 operate as web servers. However, the invention is not so limited, and servers 205-206 may operate to provide virtually any service, information and the like. As such, devices that operate as servers 205-206 include personal computers, desktop computers, multiprocessor systems, microprocessor-based or programmable consumer electronics, network PCs, servers, network appliances, and the like.

As shown in FIG. 2, an audit may be performed upon an outside (on the opposing side of firewall 106 of an enterprise network) employing auditor 112 and audit extension 110 to extend the audit. In one embodiment, audit extension 110 enables an audit assessment for security vulnerabilities of servers 205-206, network 103, or the like, employing a reflected audit. In one embodiment, auditor 112 enables auditing for security vulnerabilities of internal and external devices, and networks. Employing audit extension 110 enables the extension of an audit across networks, through firewalls, and even across geographical areas. Moreover, audit extension 110 enables auditor 112 to virtually simultaneously audit a device from both sides of firewall 106. That is, the audit may be performed by sending traffic at substantially the same time from both audit extension 110 and auditor 112 towards one or more or servers 205-206, 107-108, or the like.

Servers 107-108 and servers 205-206 represent embodiments of computing assets upon which an enterprise may perform a computing security audit. However, computing security audits may also be performed upon network 104, firewall 106, or the like, without departing from the scope or spirit of the invention.

Figure 3:
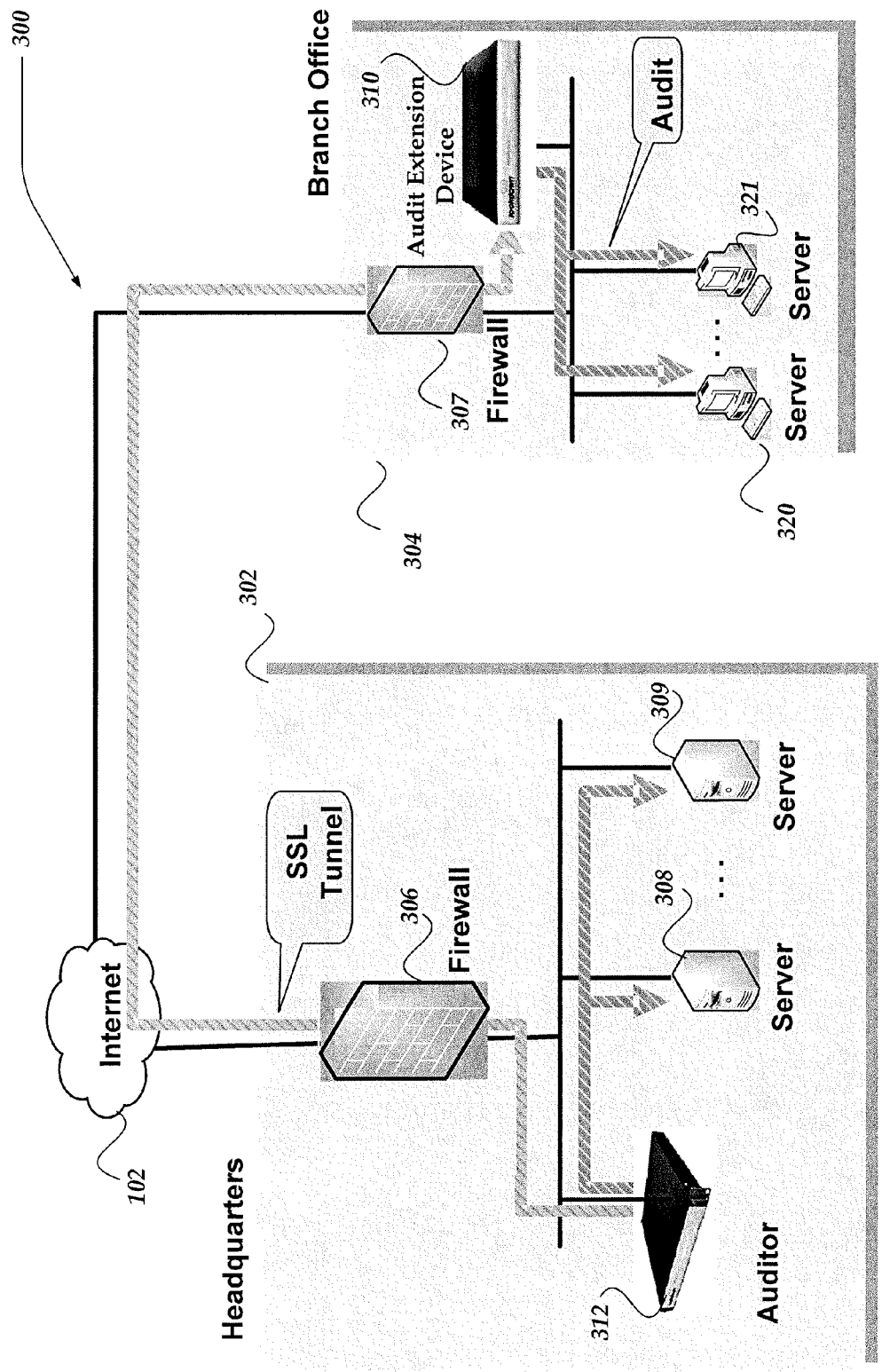
FIG. 3 illustrates one embodiment of an environment employing the invention for multiple vantage points, such as branch offices of a business.

FIG. 3 illustrates one embodiment of an environment employing the invention from multiple vantage points, such as branch offices of a business, enterprise, or the like. System 300 may include many more, or less, components than those shown, however, those shown are sufficient to disclose an illustrative embodiment for practicing the invention.

As shown in the figure, system 300 includes Internet 102, headquarters 302, and branch office 304. Headquarters 302 includes firewall 306, auditor 312, and servers 308-309. Branch office 304 includes firewall 307, audit extension device 310, and servers 320-321. Headquarters 302 and branch office 304 are intended to represent one networking boundaries of the illustrated computing devices. However, other networking boundaries and configurations of networking boundaries may be employed without departing form the spirit of the invention.

Auditor 312 is in communication with firewall 306. Firewall 306 is in communication with Internet 102. Internet 102 is in communication with firewall 307. Firewall 307 is in communication with audit extension device 310, and audit extension device 310 is in communication with servers 320-321. Auditor 312 is also in communication with servers 308-309.

Servers 320-321 include virtually any computing device residing within networking boundaries of branch office 304 that may be configured to communicate with servers 308-309. As such, devices that may operate as servers 320-321 include personal computers, desktop computers, multiprocessor systems, microprocessor-based or programmable consumer electronics, network PCs, servers, or the like.

Firewalls 306-307 are configured to operate in a substantial similar manner to firewall 106 of FIG. 1. Servers 309 may operate substantially similar to servers 108 of FIG. 1. Audit extension device 310 and auditor 312 may also operate substantially similar to audit extension device 110 and auditor 112 of FIG. 1, respectively. However, as shown in FIG. 3, audit extension device 310 is configured to enable auditor 312 to perform a remote audit of servers 320-31 and/or networks, and other devices, servers, or the like (not shown) that reside within branch office 304. Thus, in one embodiment, audits may be performed by auditor 312 through audit extension device 310 upon devices and networks at a remote site, across one or more security perimeters.

Servers 308-309, servers 320-321, and firewalls 306-307 represent embodiments of computing assets upon which an enterprise may perform a computing security audit.

Figure 4:
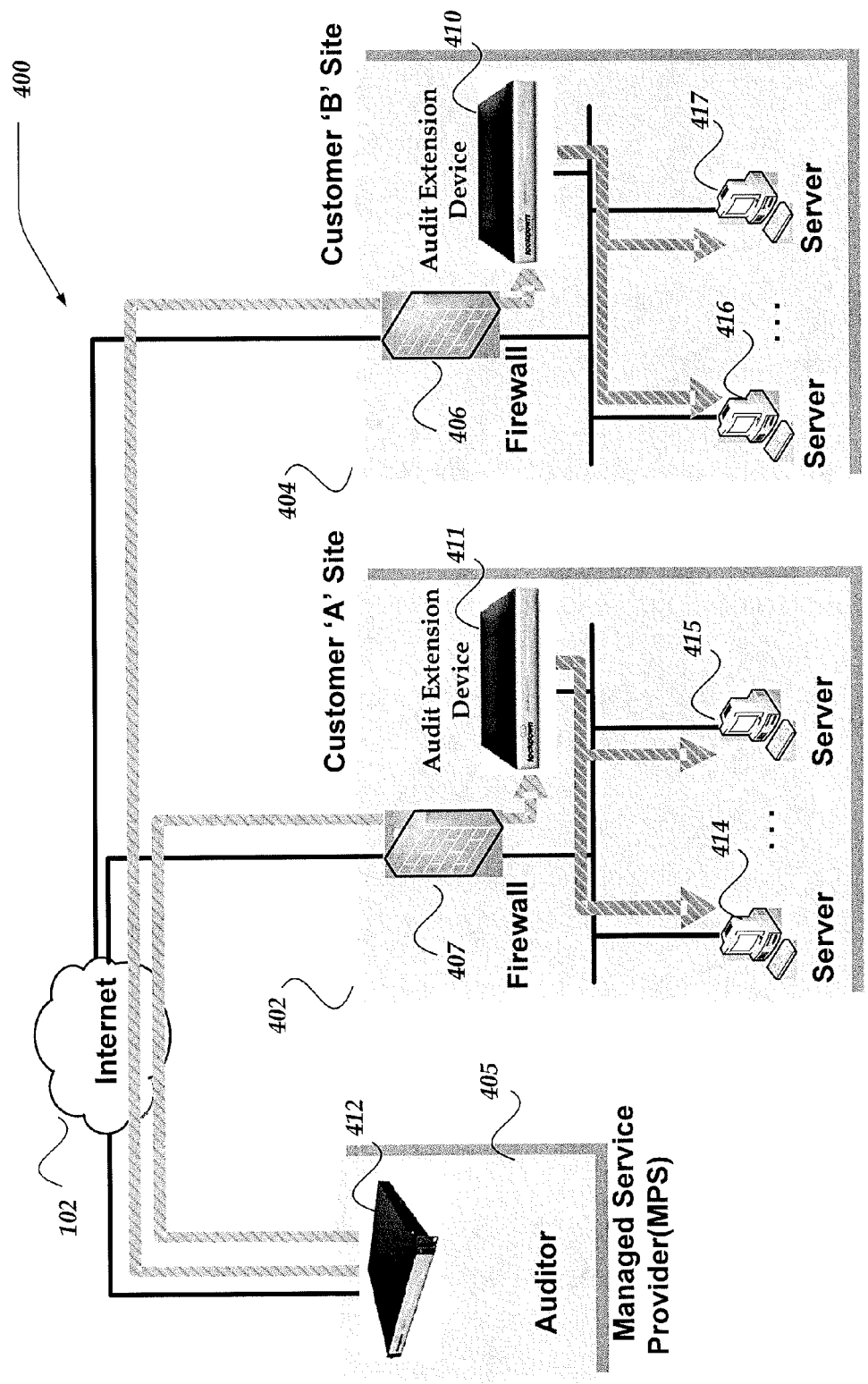
FIG. 4 illustrates one embodiment of an environment employing the invention across multiple network vantage points, such as a managed service provider's service operation centers.

FIG. 4 illustrates one embodiment of an environment employing the invention across multiple network vantage points, such as a managed service provider's service operation centers. System 400 of FIG. 4 may include many more, or less, components than those shown, however, those shown are sufficient to disclose an illustrative embodiment for practicing the invention.

As shown in the figure, system 400 includes Internet 102, managed service provider (MSP) 405, and customer sites 402 and 404. MSP 405 includes auditor 412. Customer site 402 includes firewall 407, audit extension device 411, and servers 414-415. Customer site 404 includes firewall 406, audit extension device 410, and servers 416-417. Customer sites 402 and 404 are each intended to represent networking boundaries of computing devices.

Firewalls 406-407 operate substantially similar to firewall 106 of FIG. 1. Servers 414-417 operate substantially similar to servers 320-321 of FIG. 3, except that servers 414-415 and servers 416-417 are further configured to communicate with each other.

As shown, auditor 412 is in communication with Internet 102. Internet 102 is in communication with firewall 407. Firewall 407 is in communication with audit extension device 411. Audit extension device 411 is in communication with servers 414-415. Internet 102 is in further communication with firewall 406. Firewall 406 is in communication with audit extension device 410. Audit extension device 410 is in communication with servers 416-417.

Audit extension devices 410-411 operate substantially similar to audit extension device 110 of FIG. 1. Auditor 412 operates substantially similar to auditor 112 of FIG. 1. However, as illustrated in FIG. 4, at least one audit extension device (410-411) is located on distinct networks, such as those of customer site 404 and 402, respectively. As such, audit extension devices 410-411 may be configured to enable auditing of computing devices, and networks within a same network, network boundary, LAN, network segment, or the like. Moreover, auditor 412 is configured to perform audits of servers 414-417 through audit extension devices 410-411.

Similar to above, servers 414-417, and firewalls 406-407, as well as other network components within customer sites 402 and 404 represent embodiments of computing assets upon which an enterprise may perform a computing security audit.

Figure 5:
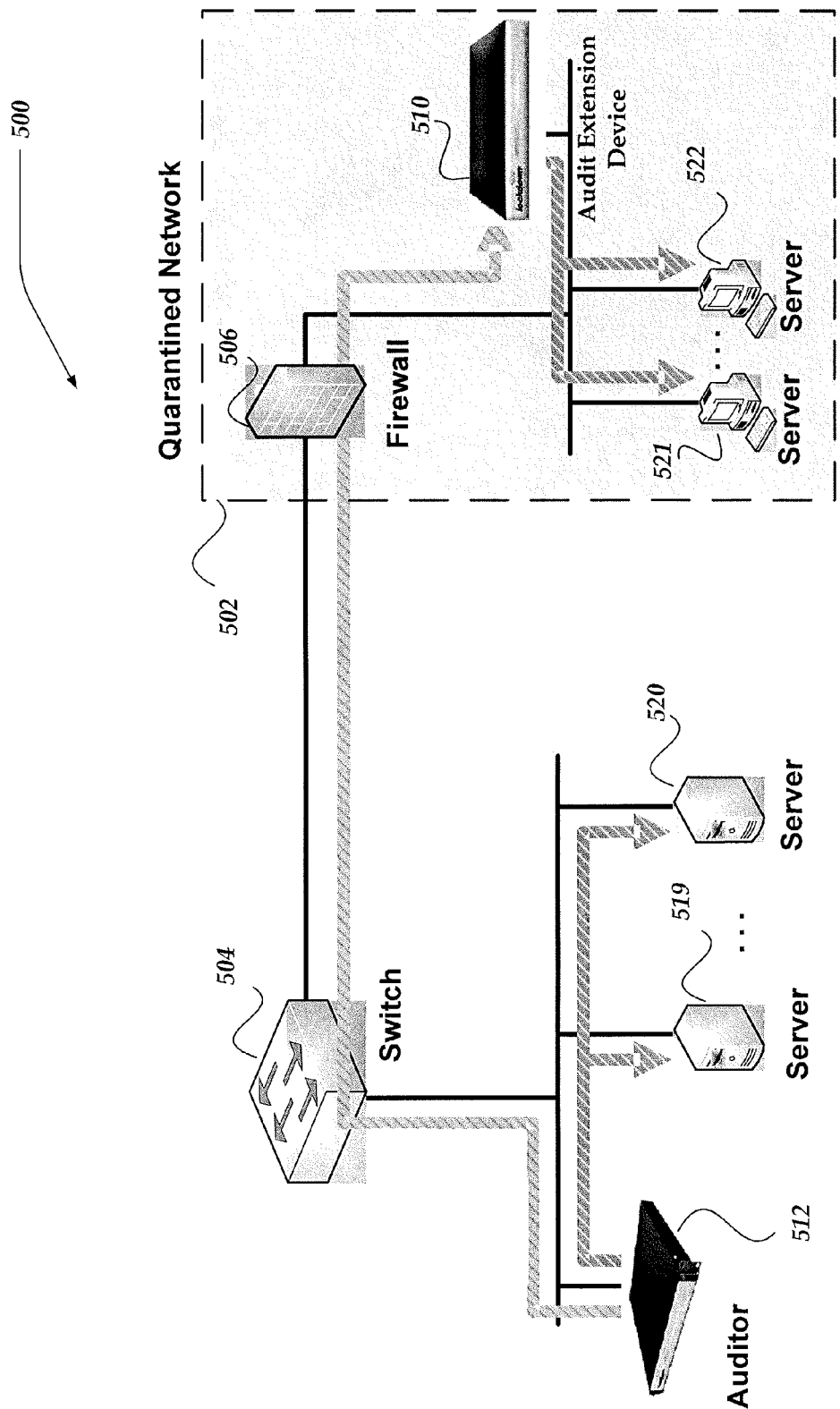
FIG. 5 illustrates one embodiment of an environment employing the invention for managing a quarantined network.

FIG. 5 illustrates one embodiment of an environment employing the invention for managing a quarantined network. System 500 of FIG. 5 may include many more, or less, components than those shown, however, those shown are sufficient to disclose an illustrative embodiment for practicing the invention.

As shown in the figure, system 500 includes quarantined network 502, switch 504, auditor 512, and servers 519-520. Quarantined network 502 includes firewall 506, audit extension device 510, and servers 521-522. Firewall 506 may operate substantially similar to firewall 106 of FIG. 1. Servers 521-522 may operate substantially similar to servers 320-321 of FIG. 3, and servers 519-520 may operate substantially similar to servers 107-108 of FIG. 1.

As shown, auditor 512 is in communication with switch 504. Auditor 512 is also in communication with servers 519-520. Switch 504 is in communication with firewall 506. Firewall 506 is in communication with audit extension device 510. Audit extension device 510 is in communication with servers 521-522.

Switch 504 may include virtually any network device that is configured to isolate selected network traffic between quarantined network 502 and other networks and devices, includes servers 519-520. Although switch 504 is illustrated as a switch, the invention is not so limited. For example, switch 504 may be implemented as a bridge, router, gateway, proxy server, or the like.

Auditor 512 and audit extension 510 may operate similar to auditor 112 and audit extension device 110 of FIG. 1, respectively. However, audit extension device 510 is configured to maintain a secure communication with auditor 512, such that auditor 512 is enabled to employ audit extension device 510 to perform an audit assessment on servers 521-522, and/or other devices, servers, and related networks (not shown) within quarantined network 502.

Servers 519-522, and firewall 506, as well as other network components within quarantined network 502 represent embodiments of computing assets upon which an enterprise may perform a computing security audit.

Figure 8:
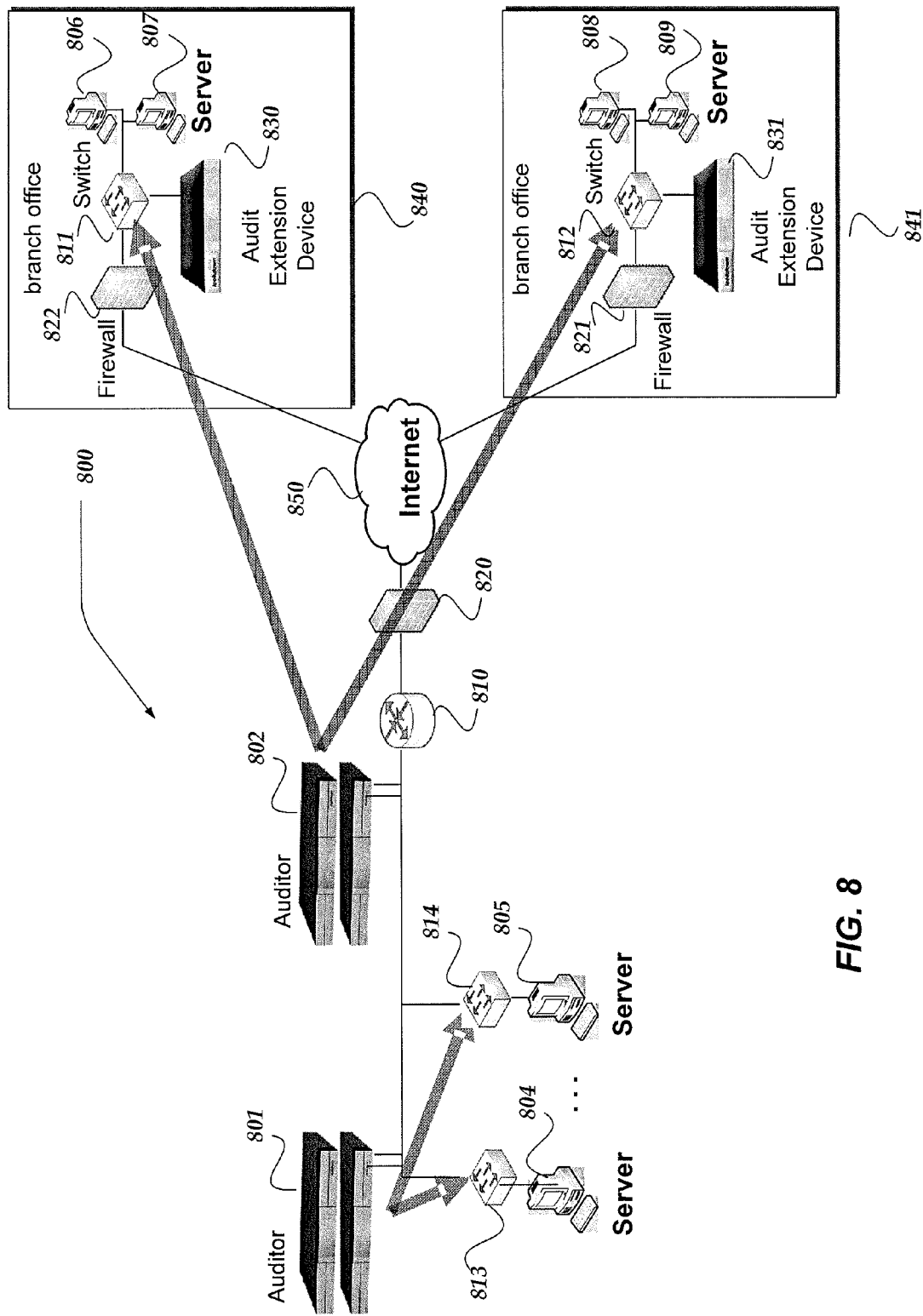
FIG. 8 illustrates an overview of a system that employs at least one auditor and at least one audit extension device to securely quarantine and/or perform vulnerability audits on nodes dispersed across multiple networks.

FIG. 8 illustrates an overview of a system that employs at least one auditor as discussed above and at least one audit extension device to both securely quarantine and perform vulnerability audits on nodes dispersed across multiple networks. System 800 may include many more, or less, components than those shown, however, those shown are sufficient to disclose an illustrative embodiment for practicing the invention.

As shown in the figure, system 800 includes auditors 801-802, switches 810 and 813-814, servers 804-805, firewall 820, network 850, and branch offices 840-841. Branch office 840 includes firewall 822, switch 811, audit extension device 830, and servers 806-807. Branch office 841 includes firewall 821, switch 812, audit extension device 831, and servers 808-809.

Auditor 801 is in communication with switches 810 and 813-814. Switch 813 is in communication with server 804. Switch 814 is in communication with server 805. Auditor 801 is also in communication with auditor 802 and switch 810. Switch 810 is in communication with firewall 820. Firewall 820 is in communication with network 850. Network 850 is in communication with firewalls 822-821. Switch 811 is in communication with audit extension device 830, servers 806-807 and firewall 822. Switch 812 is in communication with audit extension device 831, servers 808-809 and firewall 821. In one embodiment, auditors 801-802 may operate in a substantial similar manner to auditor 112 of FIG. 1 described above. Audit extension devices 830-831 may operate in a substantial similar manner to audit extension device 110.

As shown in the figure, auditor 801 is arranged to manage servers that are coupled to the same switch. Also, the mirrored redundancy provided by auditor 801 can improve reliability of the system. Auditors 801-802 are arranged to communicate through various routers and switches, such as switch 810, across multiple networks with audit extension devices 830-831 that logically, and/or physically, reside on a VLAN in branch offices 840-841, respectively. Communication tunnels between the auditors 802 and the locally situated audit extension devices 831-832 enable the operation of auditor 802 to appear "local" to the managed servers 806-809 on the VLANs.

Audit extension devices 830-831 can also enable auditor 802 to locally manage the operation of switches 811-812 for the respective servers 806-809 in the corresponding branch offices 840-841. The presence of the audit extension devices 830-831 on the VLAN at branch offices 840-841 enables remote network address control without diminishing the capacity of layer 2 network accesses through a router. For example, auditor 802 may employ audit extension device 830-831 to remotely quarantine computing assets, such as servers 806-809. It is understood that Layer 2 refers to the Open Systems Interconnection (OSI) reference model for network communications.

Additionally, if it is determined that one of auditors 801-802 fails to perform its actions for at least one of a plurality of failure or fail-safe reasons, at least one of audit extension devices 830-831 can automatically switch to operating as an auditor. In one embodiment, the audit extension device that assumed that role of the auditor may maintain that role until the remotely located auditor can resume proper operation again, or another auditor indicates that it is to assume the role. Such fail-safe reasons include, but are not limited to a network failure, a device failure, a component incompatibility with an auditor that may affect its quarantining of a device, a component failure with an auditor that may affect its auditing of a device, communication with a device, or the like.

Figure 9:
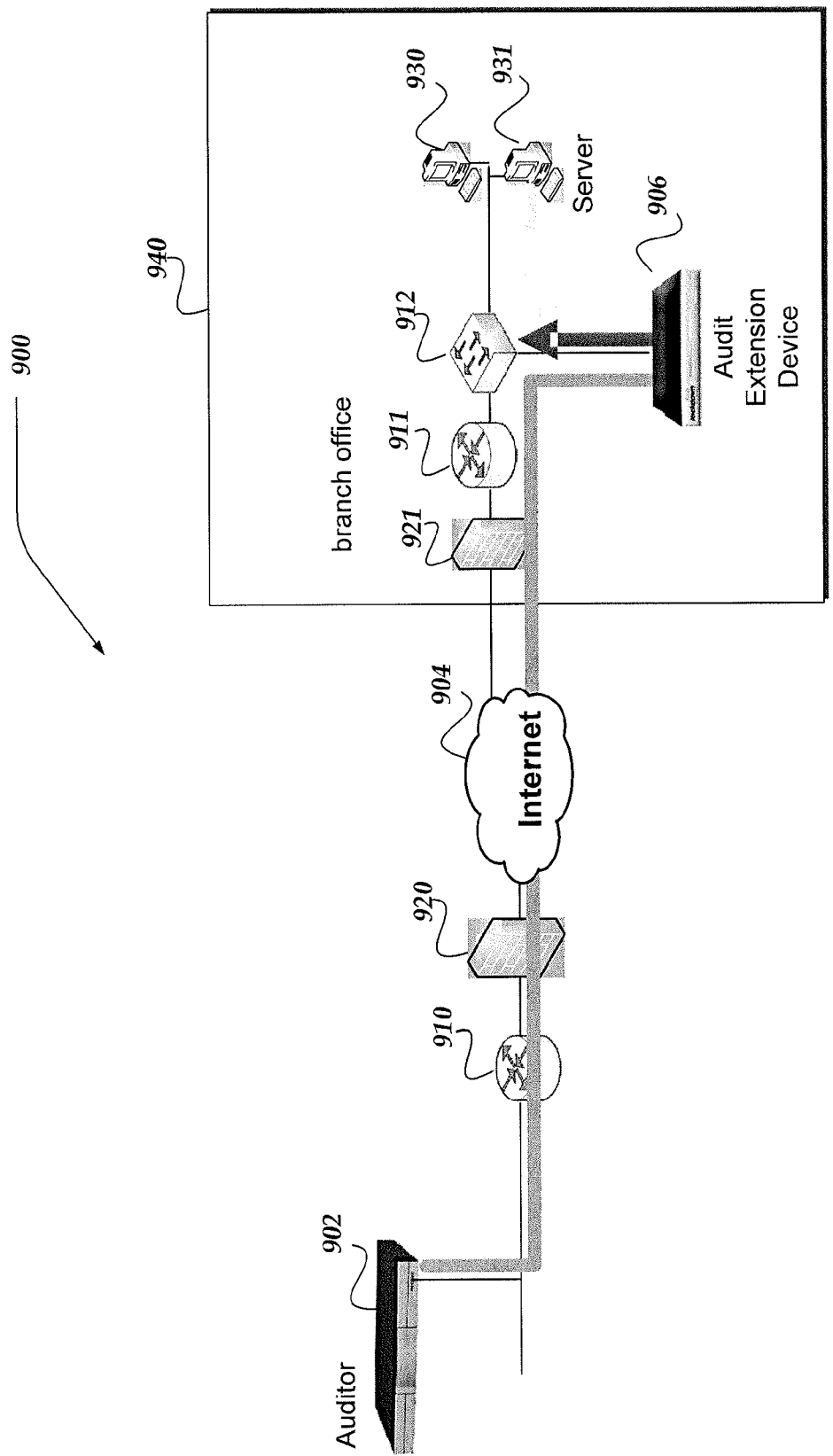
FIG. 9 illustrates an overview of the operation of a system architecture that employs both an auditor and an audit extension device to securely quarantine and perform vulnerability audits on a plurality of servers remotely located in a branch office.

FIG. 9 illustrates an overview of the operation of a system architecture that employs both auditor 902 and audit extension device 906 to securely quarantine and perform vulnerability audits on a plurality of servers remotely located in a branch office 940. System 900 may include many more, or less, components than those shown, however, those shown are sufficient to disclose an illustrative embodiment for practicing the invention.

As shown in the figure, system 900 includes auditor 902, switch 910, firewall 920, network 904, and branch office 940. Branch office 940 includes firewall 921, switches 911-912, audit extension device 906, and servers 930-931. In one embodiment, auditor 902 may operate in a substantial similar manner to auditor 112 of FIG. 1. Audit extension device 906 may operate in a substantial similar manner to audit extension device 110 of FIG. 1.

Auditor 902 is in communication with switch 910. Switch 910 is in communication with firewall 920. Firewall 920 is in communication with network 904. Network 904 is in communication with firewall 921. Firewall 921 is in communication with switch 911. Switch 911 is in communication with switch 912. Switch 912 is in communication with audit extension device 906, servers 930-931.

As shown, tunneled communications between auditor 902 and audit extension device 906 enable auditor 902 appear local to servers 930-931 at the branch office 940. In one embodiment, auditor 902 may appear on a VLAN. Through the tunnel, auditor 920 can manage the operation of branch office 940. Also, audit extension device 906 can locally perform network learning, IP to ARP binding, summarization of SNMP traps, or the like, and provide this information to remotely located auditor 902.

Audit extension device 906 may monitor the operation of auditor 902 for diminished capacity including one or more factors, such as latency, number of errors, dropped packets, bandwidth constraints, broken connection, and the like. If diminished capacity is detected, audit extension device 906 can switch to a fail-safe mode and assume auditor functionality such as quarantines, audits, or the like. In one embodiment, such assumed role may be maintained until another remotely located auditor is available to assume the role. Also, audit extension device 906 can take over as a local auditor, such as auditor 902, if it is determined that auditor 902 is rebooting, or based on a variety of other fail-safe reasons.

In one embodiment, after audit extension device 906 switches over to a fail safe mode of operation as a local auditor, it can freeze the number of nodes on the VLAN. In one embodiment, this may be performed using an IP address map, or the like. Also, prior to a fail-safe mode the local auditor (e.g., auditor 092, or the like) can learn about different available port(s) and provide that information to audit extension device 906 to use if the fail-safe mode occurs.

Once the condition(s) that caused a fail-safe mode to occur are determined to no longer be present, several operations may occur to enable remotely located auditor 902 to reassume its role. For example, the tunnel between remotely located auditor 902 and the audit extension device 906 may be re-established. Either auditor 902 or audit extension device 906 can be the initiator of the tunnel. In one embodiment, the device that initiates creation of the tunnel may be selectively configurable by an administrator. Switch 912 at branch office 940 may also be returned to a "pre-fail-safe" mode of operation. Information obtained by audit extension device 906 during the fail-safe mode of operation may also be provided to auditor 902. Also, if there are redundant remotely located auditors (not shown), they may also be mirrored and/or provided with any additional information. Such information may be employed, for example, to synchronization the devices.

Illustrative Network Appliance

Figure 6:
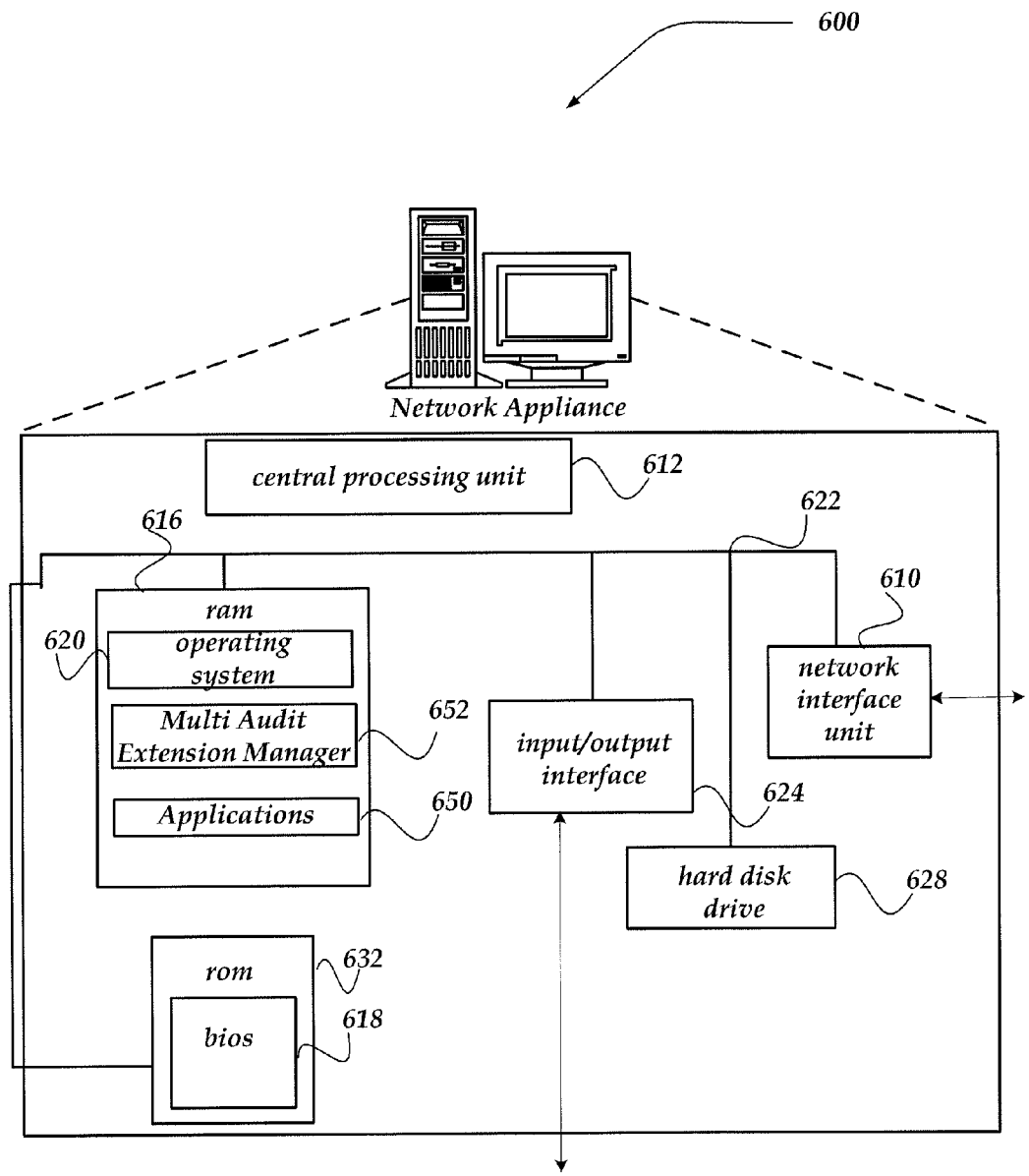
FIG. 6 illustrates one embodiment of a network appliance that may be included in a system implementing the invention.

FIG. 6 shows one embodiment of a network appliance, according to one embodiment of the invention. Network appliance 600 may include many more components than those shown. The components shown, however, are sufficient to disclose an illustrative embodiment for practicing the invention. In addition, although the invention illustrates use of a network appliance, the invention is not so constrained, and virtually any network computing device may be employed, including a server, and the like. In one embodiment, network appliance 600 may operate as an auditor device, an audit extension device, or the like, as shown in FIGS. 1-5.

Network appliance 600 includes processing unit 612, and a mass memory, all in communication with each other via bus 622. The mass memory generally includes RAM 616, ROM 632, and one or more permanent mass storage devices, such as hard disk drive 628, tape drive, optical drive, and/or floppy disk drive. The mass memory stores operating system 620 for controlling the operation of network appliance 600. Any general-purpose operating system may be employed. Basic input/output system ("BIOS") 618 is also provided for controlling the low-level operation of network appliance 600. As illustrated in FIG. 6, network appliance 600 also can communicate with the Internet, or some other communications network, such as shown in FIGS. 1-5, via network interface unit 610, which is constructed for use with various communication protocols including the TCP/IP protocol. Network interface unit 610 is sometimes known as a transceiver, transceiving device, network interface card (NIC), and the like.

Network appliance 600 may also include an SMTP handler application for transmitting and receiving email. Network appliance 600 may also include an HTTP handler application for receiving and handing HTTP requests, and an HTTPS handler application for handling secure connections. The HTTPS handler application may initiate communication with an external application in a secure fashion.

Network appliance 600 also includes input/output interface 624 for communicating with external devices, such as a mouse, keyboard, scanner, or other input devices not shown in FIG. 6. Likewise, network appliance 600 may further include additional mass storage facilities such as hard disk drive 628. Hard disk drive 628 is utilized by network appliance 600 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 650 are loaded into mass memory and run on operating system 620. Examples of application programs include email programs, schedulers, calendars, web services, transcoders, database programs, word processing programs, spreadsheet programs, and so forth. Mass storage may further include applications such as Multi Audit extension Manager (MAM) 652.

MAM 652 enables auditing network vulnerabilities from multiple network vantage points, virtually simultaneously. MAM 652 may be configured to perform at least those actions described in conjunction with FIG. 7. For example, MAM 652 extends a reach of an auditing device, such as shown in FIGS. 1-5, to audit devices on network perimeters, remote sites, from either side of a security perimeter, through a security perimeter, or the like.

MAM 652 may be configured to receive updates that may include vulnerability tests, hacker signatures, audit tools, or the like, on an on-going basis, or based on an event, condition, or the like. MAM 652 may receive the updates automatically, requiring virtually little or no intervention from an Information Technology staff, administrator, or the like. MAM 652 may receive such updates, and provide assessments through a secure network path, using, such as SSL, TLS, EAP-TLS, or the like. In one embodiment, the secure network path is encrypted. However, the invention is not constrained to these protocols, and virtually any encrypted network protocol may be used to authenticate access and/or encrypt network traffic between network appliance 600 and another device. Moreover, MAM 652 may provide an integrated wireless security and auditing solution for virtually all wireless 802.11x access points and clients. In addition, in one embodiment, the secure network path is configured to tunnel through a firewall, across networks, security perimeters, around security perimeters, or the like.

Generalized Operations

Figure 7:
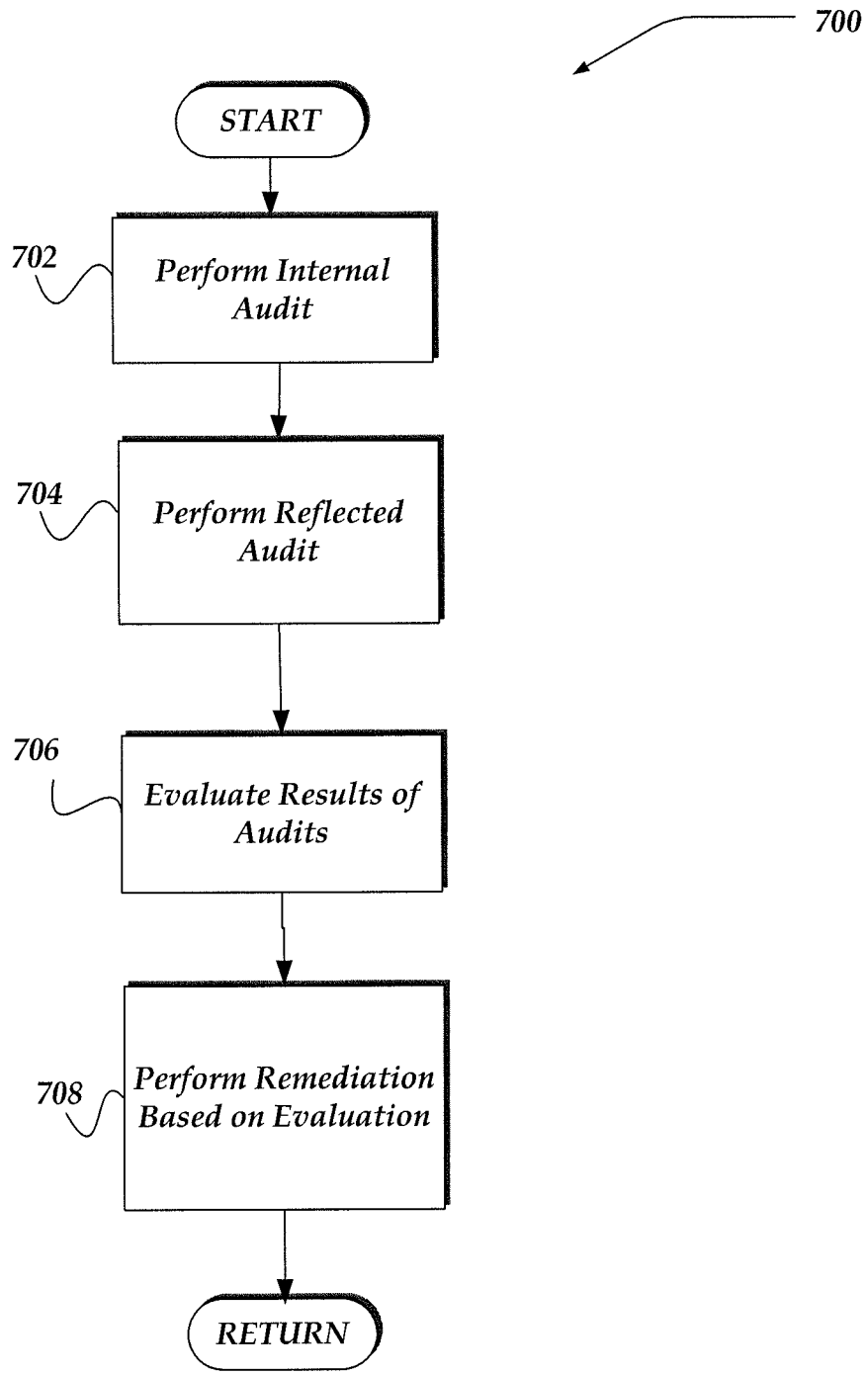
FIG. 7 illustrates a logical flow diagram generally showing one embodiment of a process of managing a security vulnerability.

The operation of certain aspects of the invention will now be described with respect to FIG. 7 and FIG. 10. FIG. 7 illustrates a logical flow diagram generally showing one embodiment of a process of managing a security vulnerability. Process 700 may be implemented, for example, within auditor 112 and/or audit extension device 110 of FIG. 1, or the like.

Process 700 begins, after a start block, at block 702, where an internal audit is performed upon a network device within a security perimeter. Thus, the internal audit may include examination of various aspects of the network device to determine whether the network device is in compliance with a security policy. The audits may include, but are not limited to, determining a configuration of the network device, performing attempts to access various resources through the network device, or the like. The audit may be performed based on a predefined schedule, based on an event, such as a configuration change, a request from another device, an administrator, or the like. In one embodiment, the internal audit may produce an internal audit result. The internal audit result may include a report, a script, a database entry, or the like. Referring to FIG. 1, the internal audit may be performed by auditor 112 upon one or more servers 107-108, network 104, or the like. Similarly, in FIG. 3, the internal audit may be performed by auditor 312 upon servers 308-309, or the like. Processing then continues to block 704.

At block 704, a reflected audit may be performed on one or more network devices, networks, or the like. In one embodiment, the reflected audit is initiated by an audit device on one side of a security perimeter and is performed using an audit extension device on the other side of the security perimeter. Thus, in one embodiment, the reflected audit may employ an audit extension device, such as audit extension device 110 of FIG. 1, audit extension device 310 of FIG. 3, and/or audit extension devices 410-411 of FIG. 4.

In one embodiment, the network device to be audited may reside within the security perimeter, such as servers 107-108 of FIG. 1. In that configuration, the reflected audit may be reflected back through the security perimeter by the extension audit device residing on the outside of the security perimeter. Referring to FIG. 1, the reflected audit may then be reflected by audit extension device 110 back through firewall 106 to evaluate one or more servers 107-108, network 104, or the like.

In another embodiment, the reflected audit may be sent through the security perimeter and reflected towards a network device, network. For example, as shown in FIG. 2, the illustrated audit extension device reflects the audit to one or more servers 205-206 on the outside of the security perimeter. Similarly, the reflected audit may be sent through the security perimeter and reflected or redirected towards servers 320-321 of FIG. 3. The reflected audit result may produce a reflected audit result. In one embodiment, the reflected audit result may be provided through a secure network path towards the auditor. Processing then continues to block 706.

At block 706, the results of the internal and/or reflected audits are evaluated to determine whether they indicate compliance to a security policy. For example, the audit results may indicate whether that the audited device, network, or the like, includes adequate network resources and/or security, a determined configuration, procedures, provides determined responses to particular events, or the like. Processing then continues to block 708.

At block 708, based on the determination at block 706, one or more remediation actions may be performed, including, but not limited to quarantining a non-compliant device, network, or the like, performing an action that enables the audited network, device or the like, to be brought into compliance, or the like. Processing then may return to a calling process.

Figure 10:
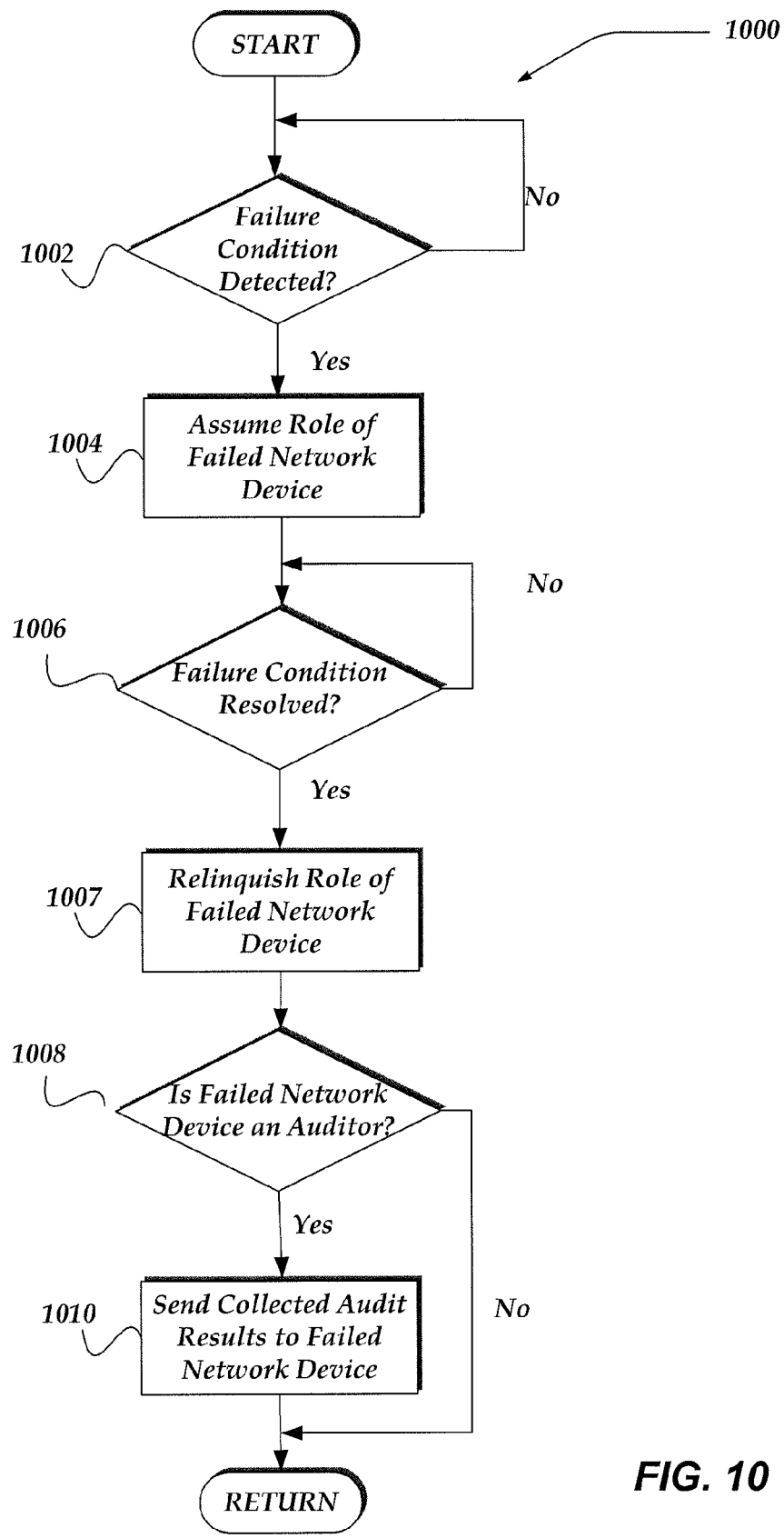
FIG. 10 illustrates a logical flow diagram generally showing one embodiment of a process of managing a fail-safe mode of operation, in accordance with the present invention.

FIG. 10 illustrates a logical flow diagram generally showing one embodiment of a process of managing a fail-safe mode of operation. Process 1000 may be implemented, for example, within auditors 801-802 and/or audit extension devices 830-831 of FIG. 8.

The terms "master," and "slave," as employed herein describe a relationship between two (or more) audit network devices. For example, in one embodiment, an auditor may be designated as a master network device, while an audit extension device or another auditor may be designated as a slave network device to the master network device. Similarly, in another embodiment, one audit extension device may be designated as a master network device, while another audit extension device may be designated as a slave network device to that master.

Communications may occur between the master network device and the slave network device that enables the slave to assume a role of the master in the event of a detected failure or fail-safe condition. Such communications, for example, may provide information that enables the master and slave network devices to share information, such as audit results, state information, assigned devices, or the like. Such information may be used to synchronize the master and slave devices. The communications may also provide information that indicates a failure condition, a diminished capacity of one of the network devices, or the like. The communications may, in one embodiment, be over a secure channel.

In process 1000, a slave network device may be monitoring and communicating information with a master network device. Thus, process 1000 begins, after a start block, at decision block 1002, where a determination is made whether a fail-safe (e.g., a failure) condition is detected of a predetermined network device. Such predetermined network devices include an auditor, an audit extension device, or the like. The fail-safe condition may include a diminished capacity of a network device, a network failure, a rebooting of a network device, or the like. If the fail-safe condition is detected, then processing continues to block 1004. Otherwise, processing loops back to decision block 1002.

At block 1004, a network device assumes the role of the failed network device. In one embodiment, the slave network device may assume the role of a master network device. For example, the slave network device may be an audit extension device, such as one of audit extension devices 830-831 of FIG. 8. In one embodiment, the failed master network device may be one of auditor 802 of FIG. 8. Thus, in one embodiment, the audit extension device may assume the role of the auditor. That is, in one embodiment, the audit extension device may assume auditor functionality including, for example, performing quarantines, audits, or the like.

In another example, the failed network device may be one of audit extension devices 830-831 of FIG. 8. In this example, another audit extension device may act as the slave network device and assume the role of the failed audit extension device. That is, for example, the other audit extension device may provide a reflected audit of servers, or the like.

Processing then continues to decision block 1006, where a determination is made whether the fail-safe condition is resolved, or is no longer detected. In one embodiment, the fail-safe condition may be resolved when it is determined that the failed network device no longer has diminished capacity, the network has adequate latency and/or bandwidth, or the network device is otherwise properly functioning. If the fail-safe condition is resolved, then processing continues to block 1007. Otherwise, processing loops back to block 1006.

At block 1007, the network device relinquishes the role of the failed network device. In one embodiment, the slave network device might relinquish the role of performing audits, quarantines, or the like.

Processing then continues to decision block 1008, where a determination is made whether the failed master network device is an auditor. If the failed master device is not an auditor, then processing may return to a calling process to perform other actions. Otherwise, if the failed master device is an auditor, then processing continues to block 1010 where the slave network device sends collected information, such as collected audit results, gathered during its role as the master network device, to the master network device. Processing then may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing an audit by an audit extension device, comprising:
    initiating communication between an audit extension device and an audit device for an audit by receiving, by the audit extension device through a security perimeter from the audit device, a request for the audit to be performed on a plurality of computing assets, the request for the audit including a request for information to be provided by the plurality of computing assets, wherein the plurality of computing assets are separate from the audit device;
    reflecting the audit based on the request for the audit towards the plurality of computing assets;
    sending, by the audit extension device, a result of the audit through the security perimeter to the audit device;
    assuming operations, by the audit extension device, of the audit device in response to a first detection indicating that the audit device is in a failure condition; and
    communicating with at least one of a network device and the audit device, and relinquishing operations of the audit device in response to a second detection indicating at least one of:
        that the audit device is not in the failure condition, and
        that the network device is assuming operations of the audit device.

2. The method of claim 1, wherein the plurality of computing assets are on a same side of the security perimeter as the audit extension device.

3. The method of claim 1, wherein the request for the audit further includes at least one of a request for a configuration, a probe, or a request for a resource associated with the plurality of computing assets.

4. The method of claim 1, wherein the audit extension device is configured as a network appliance.

5. The method of claim 1, wherein at least one of the receiving the request for the audit or the sending the result of the audit is performed through a secure network path.

6. The method of claim 1, wherein the plurality of computing assets are on a different networking side of the security perimeter as the audit extension device.

7. A method for managing an audit by an audit device, comprising:
    initiating communication between an audit extension device and an audit device for an audit by sending a request for the audit to be performed on a plurality of computing assets through a security perimeter to the audit extension device, the request for the audit including a request for information to be provided by the plurality of computing assets, wherein the plurality of computing assets are separate from the audit device;
    receiving, by the audit device, a result of the audit from the audit extension device through the security perimeter;
    performing a remediation action based at least in part on a security policy; and
    relinquishing operations to the audit extension device in response to a first detection indicating that the audit device is in a failure condition;

wherein the operations of the audit extension device is relinquished in response to a second detection indicating at least one of:
   that the audit device is not in the failure condition, and
   that a network device is assuming operations of the audit device.

8. The method of claim 7, wherein the plurality of computing assets are on a same side of the security perimeter as the audit extension device.

9. The method of claim 7, wherein the request for the audit further includes at least one of a request for a configuration, a probe, or a request for a resource associated with the plurality of computing assets.

10. The method of claim 7, wherein the performing the remediation action includes at least one of providing a recommendation on a configuration, control, security policy, or a procedure associated with the plurality of computing assets.

11. The method of claim 7, wherein the audit device is configured as a network appliance.

12. The method of claim 7, wherein the plurality of computing assets are on a different networking side of the security perimeter as the audit extension device.

13. The method of claim 7, further comprising instructing the audit extension device to quarantine a computing asset of the plurality of computing assets in a quarantined network in response to the computing asset failing to satisfy the security policy.

14. The method of claim 13, further comprising removing the computing asset from the quarantined network in response to the result of the audit or the remediation action indicating that the computing asset satisfies the security policy.

15. The method of claim 7, wherein at least one of the sending the audit request or the receiving the result of the audit is performed through a secure network path.

16. A non-transitory computer-readable medium storing executable instructions that, when executed, cause an audit device to perform operations, comprising:
   initiating communication between an audit extension device and an audit device for an audit by sending a request for the audit to be performed on a plurality of computing assets through a security perimeter to the audit extension device, the request for the audit including a request for information to be provided by the plurality of computing assets, wherein the plurality of computing assets are separate from the audit device;
   receiving, by the audit device, a result of the audit from the audit extension device through the security perimeter;
   performing a remediation action based at least in part on a security policy; and
   relinquishing operations to the audit extension device in response to a first detection indicating that the audit device is in a failure condition;
   wherein the operations of the audit extension device is relinquished in response to a second detection indicating at least one of:
     that the audit device is not in the failure condition, and
     that a network device is assuming operations of the audit device.

17. An audit extension device, comprising:
a network interface unit configured to initiate communication between an audit extension device and an audit device for an audit by receiving, through a security perimeter from the audit device, a request for the audit to be performed on a plurality of computing assets, the request for the audit including a request for information to be provided by the plurality of computing assets; and
a processing unit configured to:
   reflect the audit based on the request towards the plurality of computing assets,
   send a result of the audit to the audit device through the security perimeter,
   assume operations of the audit device in response to a first detection indicating that the audit device is in a failure condition, and
   communicate with at least one of a network device and the audit device, and relinquish operations of the audit device in response to a second detection indicating at least one of:
     that the audit device is not in the failure condition, and
     that the network device is assuming operations of the audit device.

18. A system, comprising:
an audit extension device including:
   a first network interface unit configured to initiate communication between an audit extension device and an audit device for an audit by receiving, through a security perimeter, a request for the audit to be performed on a plurality of computing assets, the request for the audit including a request for information to be provided by the plurality of computing assets, wherein the plurality of computing assets are separate from the audit device and
   a first processing unit configured to:
     reflect the audit based on the request towards the plurality of computing assets,
     send a result of the audit to the audit device through the security perimeter,
     assume operations of the audit device in response to a first detection indicating that the audit device is in a failure condition, and
     communicate with at least one of a network device and the audit device, and relinquish operations of the audit device in response to a second detection indicating at least one of:
       that the audit device is not in the failure condition, and
       that the network device is assuming operations of the audit device; and
an audit device including:
   a second network interface unit configured to send the request for the audit through the security perimeter, and
   a second processing unit configured to:
     receive the result of the audit from the audit extension device through the security perimeter, and
     perform a remediation action based at least in part on a security policy.

* * * * *